(12) United States Patent
Furuya

(10) Patent No.: US 9,902,063 B2
(45) Date of Patent: Feb. 27, 2018

(54) ROBOT SYSTEM JUDGING ABNORMALITY OF FASTENED WORK AND ABNORMALITY JUDGMENT METHOD

(71) Applicant: FANUC CORPORATION, Yamanashi (JP)

(72) Inventor: Yoshitake Furuya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 200 days.

(21) Appl. No.: 15/068,638

(22) Filed: Mar. 14, 2016

(65) Prior Publication Data

US 2016/0288326 A1 Oct. 6, 2016

(30) Foreign Application Priority Data

Mar. 31, 2015 (JP) ................. 2015-073967

(51) Int. Cl.
| | | |
|---|---|---|
| B23Q 3/00 | (2006.01) | |
| B23Q 7/00 | (2006.01) | |
| G06F 19/00 | (2011.01) | |
| B25J 9/16 | (2006.01) | |
| B23Q 3/18 | (2006.01) | |
| B23Q 7/04 | (2006.01) | |

(52) U.S. Cl.
CPC .......... B25J 9/1633 (2013.01); B25J 9/1674 (2013.01); *B23Q 3/002* (2013.01); *B23Q 3/186* (2013.01); *B23Q 7/04* (2013.01); *G05B 2219/40453* (2013.01); *Y10S 901/02* (2013.01); *Y10S 901/30* (2013.01)

(58) Field of Classification Search
CPC .......... B23Q 3/002; B23Q 3/186; B23Q 7/04
USPC ................. 700/114, 192, 245, 261
See application file for complete search history.

(56) References Cited

U.S. PATENT DOCUMENTS

| | | | | |
|---|---|---|---|---|
| 5,587,915 A | * | 12/1996 | Nagatomi .......... | G05B 19/4065 318/565 |
| 2005/0087919 A1 | * | 4/2005 | Arai .................. | B23Q 3/06 269/329 |
| 2008/0215292 A1 | * | 9/2008 | Kato .................. | G01M 13/021 702/183 |
| 2010/0030381 A1 | * | 2/2010 | Clifford ............. | B05B 13/0292 700/258 |

FOREIGN PATENT DOCUMENTS

| | | |
|---|---|---|
| JP | 57-114389 A | 7/1982 |
| JP | 61-30359 A | 2/1986 |
| JP | 10-296644 A | 11/1998 |
| JP | 11-320477 A | 11/1999 |

(Continued)

*Primary Examiner* — Michael J Brown
(74) *Attorney, Agent, or Firm* — Hauptman Ham, LLP

(57) ABSTRACT

A robot system of the present invention has a disturbance torque monitoring part which monitors a disturbance torque of a servo motor which drives rotation about a joint of the robot in accordance with an operating command of a robot operation control part. Further, when a work gripped by the hand is fastened by a work fasting device, the abnormality judging part compares the disturbance torque with a predetermined first threshold value and, when the disturbance torque is over the first threshold value, judges that an abnormality has occurred in the position of the work fastened by the work fastening device.

3 Claims, 7 Drawing Sheets

(56) References Cited

FOREIGN PATENT DOCUMENTS

| JP | 2004-130445 A | 4/2004 |
| JP | 2010-221280 A | 10/2010 |
| JP | 2010-269412 A | 12/2010 |

* cited by examiner

ROBOT SYSTEM JUDGING ABNORMALITY OF FASTENED WORK AND ABNORMALITY JUDGMENT METHOD

The present application claims priority to Japanese Patent Application Number 2015-073967, filed Mar. 31, 2015, the disclosure of which is hereby incorporated by reference herein in its entirety.

BACKGROUND OF THE INVENTION

1. Field of the Invention

The present invention relates to a robot system provided with a hand which grips a work and makes it move to a work fastening device of a production machine and to an abnormality judgment method which judges abnormality of a work fastened by the work fastening device.

2. Description of the Related Art

In a processing machine which processes a work, an assembly machine which assembles parts with a work, or another production machine, a work is loaded into the production machine, then the production machine processes the work, the production machine assembles parts with it, etc. Further, a work table of the production machine is provided with a work fastening device for positioning and fastening a work at a predetermined position, for example, a clamp device. Further, a robot is widely used in the loading and unloading of a work to and from a clamp device.

In general, a robot uses a hand to grip a work and make it move to a clamp device of a production machine. Further, after the clamp device is used to fasten the work, the hand of the robot releases the work.

Further, the precision of processing a work and the precision of assembly of parts at a production machine are greatly affected by the precision of position of a work fastened using a clamp device. For example, if a machining chip deposits on a work seating surface at the clamp device, the work will be fastened without closely contacting the seating surface. If processing the work in this state, a product different from the target shape will end up being produced. For this reason, when using a clamp device of a production machine to fasten a work, it is necessary to confirm if the work is accurately positioned at a predetermined position.

Japanese Patent Publication. No. 2004-130445A discloses a contact confirmation device which confirms whether a work is in close contact with a seating surface. This contact confirmation device is provided with an air passage which opens at the seating surface at one end, an air supplying means for supplying air to this air passage, and an air flow detecting means which detects the presence of any flow of the air supplied to the air passage. If there is flow of the air at the air passage in the state where air is supplied to the air passage, it is considered that the work is not in close contact with the seating surface where the end of the air passage opens and that air is flowing out from the seating surface. Therefore, the contact confirmation device uses an air flow detecting means to judge the seated state of a work.

In the above-mentioned prior art, the work seating surface at the clamp device is formed so as to come in close contact with the outside surface of a work. However, works have complicated shapes. Also, works are made with relatively loose dimensional tolerances. In such a case, it is difficult to reliably make the outside surface of a work and seating surface closely contact each other. Therefore, sometimes a clearance is formed between the seating surface and the outside surface of the work due to the dimensional tolerance of the work.

If considering the above-mentioned case of using the contact confirmation device disclosed in Japanese Patent Publication No. 2004-130445A as the means for confirming if a work is accurately positioned at the seating surface by a clamp, the following problem arises. That is, the contact confirmation device judges that a work is not in close contact with the seating surface when air flows out from the seating surface. That is, when even a slight clearance is formed between the outside surface of a work and the seating surface, air will flow out from the seating surface; therefore, it will be judged that an abnormality has occurred in the seated state of the work. For this reason, even if the position of the work fastened by the clamp device is kept within an allowable range, if the state of outflow of air is detected, that work will end up being judged as not being accurately positioned.

To deal with the above problems, the method of detecting a position of a work fastened by a clamp device by a sensor has been studied. However, a sensor requires electrical wiring and causes the clamp device to become complicated and more expensive. Further, when processing a work or assembling parts, a sensor in which electrical wiring is required cannot be used if desiring to continuously make the clamp device turn in one direction. This is because the problem of the electrical wiring breaking will arise.

SUMMARY OF INVENTION

The present invention provides a robot system and abnormality judgment method which can be inexpensively configured and which can accurately judge an abnormality in a work fastened by a work fastening device at a production machine.

A first aspect of the present invention provides a robot system comprising a work fastening device which positions and fastens a work, a robot to which a hand which grips a work is attached, and a control device which controls the work fastening device and the robot, wherein the control device has a robot operation control part which causes the robot to operate to grip a work by the hand and to place the gripped work at a predetermined position of the work fastening device, a disturbance torque monitoring part which monitors a disturbance torque of a motor which drives rotation of a joint of the robot in accordance with an operating command of the robot operation control part, and an abnormality judging part which, when gripping a work by the hand of the robot, compares the disturbance torque with a predetermined first threshold value and, when the disturbance torque is over the first threshold value, judges that an abnormality has occurred in the position of the work fastened by the work fastening device.

According to the second aspect of the present invention, there is provided the robot system of the first aspect wherein the control device further comprises a frequency analysis part which breaks down a history of disturbance torque of the motor which is monitored by the disturbance torque monitoring part into a plurality of frequency components and extracts a specific frequency component from among the plurality of frequency components, and the abnormality judging part is configured to compare the specific frequency component with a predetermined second threshold value when the work gripped by the hand is fastened by the work fastening device and, when the specific frequency component is over the second threshold value, to judge that damage has occurred at the work fastened by the work fastening device.

According to a third aspect of the present invention, there is provided the first aspect or second aspect of a robot system wherein the work fastening device further comprises a work fastening part which has a seating surface which the outside surface of the work contacts and a work pushing part which has a pushing part which pushes the work against the seating surface.

Further, a fourth aspect of the present invention provides an abnormality judgment method which judges abnormality of a work which is loaded by a robot into a work fastening device and is fastened by that work fastening device, the abnormality judgment method comprising monitoring a disturbance torque of a motor driving rotation of a joint of the robot in response to an operating command to the robot and, when gripping a work by a hand of the robot, arranging it at a predetermined position of the work fastening device, and then fastening the gripped work by the work fastening device, comparing the disturbance torque with a predetermined first threshold value and, when the disturbance torque is over a first threshold value, judging that an abnormality has occurred in the position of the work fastened by the work fastening device.

According to a fifth aspect of the present invention, there is provided an abnormality judgment method further comprising, when a gripping a work by a hand of the robot, arranging it at a predetermined position of the work fastening device, and then fastening the gripped work by the work fastening device, breaking down a history of disturbance torque of the motor which is monitored into a plurality of frequency components, extracting a specific frequency component from among the plurality of frequency components, comparing that specific frequency component with a predetermined second threshold value and, when the specific frequency component is over the second threshold value, judging that damage has occurred in the work fastened by the work fastening device.

These objects, features, and advantages of the present invention and other objects features and advantages will become further clearer from the detailed description of representative embodiments of the present invention shown in the attached drawings.

DESCRIPTION OF THE PREFERRED EMBODIMENTS

Figure 1:
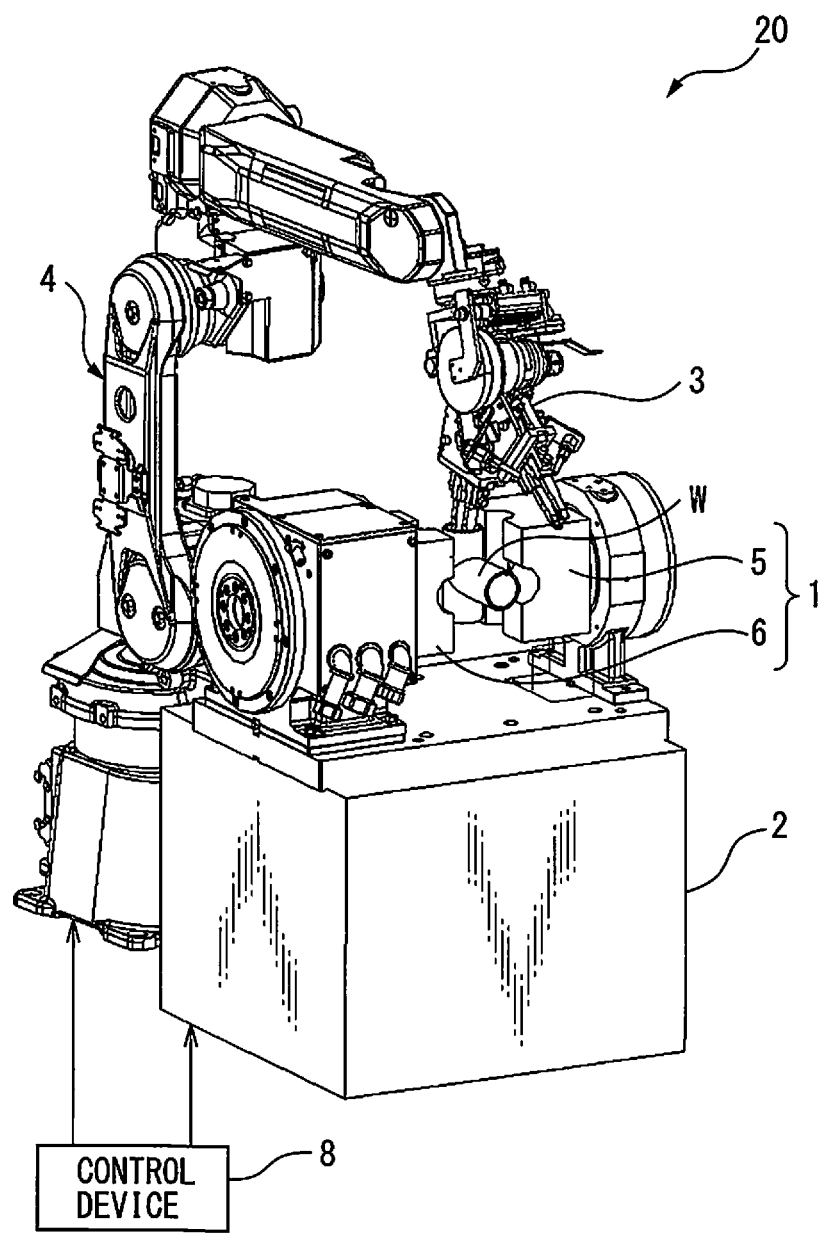
FIG. 1 is a perspective view of a robot system of a first embodiment.

Next, embodiments of the present invention will be explained with reference to the drawings. In the following drawings, similar members are assigned similar reference notations. To facilitate understanding, these drawings are suitably changed in scale. Further, the embodiments of the robot system shown in the drawings are only examples. The robot system of the present invention is not limited to the illustrated embodiments.

First Embodiment

FIG. 1 is a perspective view of a robot system according to a first embodiment.

The robot system 20 of the first embodiment, as shown in FIG. 1, comprises a production machine 2 with a clamp device 1 which positions and fastens a work W; and a robot 4 with a front end to which a hand 3 is attached. The robot 4 is a vertical multi-articulated manipulator. As the production machine 2, a processing machine which processes a work or an assembly machine which assembles parts with a work etc. may be used. Further, the clamp device 1 is set on a work table of such a production machine 2. Note that, in FIG. 1, part of the production machine 2 is shown.

Furthermore, the robot 4 is controlled to grip a work W by the hand 3 and make it move to the clamp device 1 which is set at the production machine 2. In the example shown in FIG. 1, the work W is comprised of a T-shaped tubular member. For this reason, the hand 3 of the robot 4 is provided with two finger parts. The distance between the two finger parts is broadened inside the T-shaped tubular member so as to grip the T-shaped tubular member.

Furthermore, the clamp device 1 comprises a work fastening part 5 which positions the work W and a work pushing part 6 which pushes the work W against the work fastening part 5. Since the work W is a T-shaped tubular member, the surfaces of the work fastening part 5 and work pushing part 6 which contact the outside surface of the work W are curved to match the outside surface of the T-shaped tubular member.

The robot 4 positions the work W which is gripped by the hand 3 between the work fastening part 5 and work pushing part 6 at the clamp device. Further, in the state where the hand 3 grips a work W, the clamp device 1 is operated and the work pushing part 6 pushes the work W against the work fastening part 5. Further, after the clamp device 1 is used to position and fasten the work W, the hand 3 of the robot 4 releases the work W.

Note that, the operation of the robot 4 for placing a work W at a predetermined position between the work fastening part 5 and the work pushing part 6 is taught in advance by a teaching operation or off-line programming.

Figure 2A:
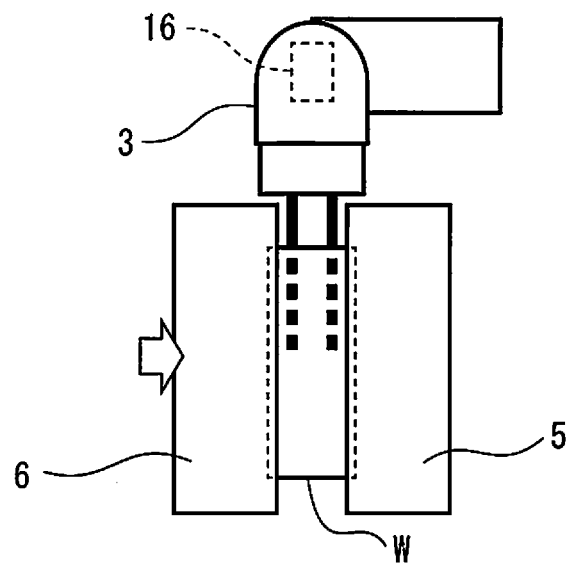
FIG. 2A is a front view schematically showing a state where a clamp device shown in FIG. 1 normally fastens a work.
Figure 2B:
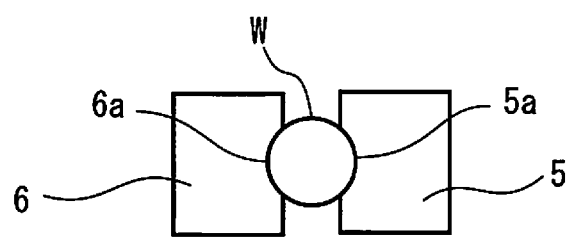
FIG. 2B is a top view of the work and clamp device shown in FIG. 2A.

Here, FIG. 2A is a front view which schematically shows the state where the clamp device 1 shown in FIG. 1 normally fastens the work W. FIG. 2B is a top view of the work W and clamp device 1 shown in FIG. 2A.

As shown in FIG. 2B, the work fastening part 5 of the clamp device 1 has a seating surface 5a which a curved outside surface of a work W constituted by a tube shaped member contacts. On the other hand, the work pushing part 6 of the clamp device 1 has a pushing surface 6a which pushes the curved outside surface of the work W constituted by a tube shaped member against the seating surface 5a of the work fastening part 5.

Further, as shown by the void arrow in FIG. 2A, the work W gripped by the hand 3 of the robot is pushed by the pushing surface 6a of the work pushing part 6 against the seating surface 5a of the work fastening part 5. At this time, as shown in FIG. 2B, the outside surface of the work W abuts against the seating surface 5a of the work fastening part 5 whereby the work W is placed to fit against the seating surface 5a of the work fastening part 5. Due to this, the work W is positioned at a predetermined position.

Note that, in the present application, the state where "the outside surface of the work W abuts against the seating surface 5a of the work fastening part 5" is not limited to a state where the outside surface of the work W closely contact the seating surface 5a. That is, even in a state where a clearance is formed between the seating surface 5a and the work W, the outside surface of the work W need only abut against the seating surface 5a of the work fastening part 5 so that the positional error of the work W is kept within a predetermined allowable range.

However, as explained above, when positioning a work W at a predetermined position by the clamp device 1, if foreign matter, for example, a machining chip, deposits on the seating surface 5a of the work fastening part 5, it becomes difficult for the work W to be positioned at a predetermined position. This point will be explained with reference to FIG. 3A and FIG. 3B.

Figure 3A:
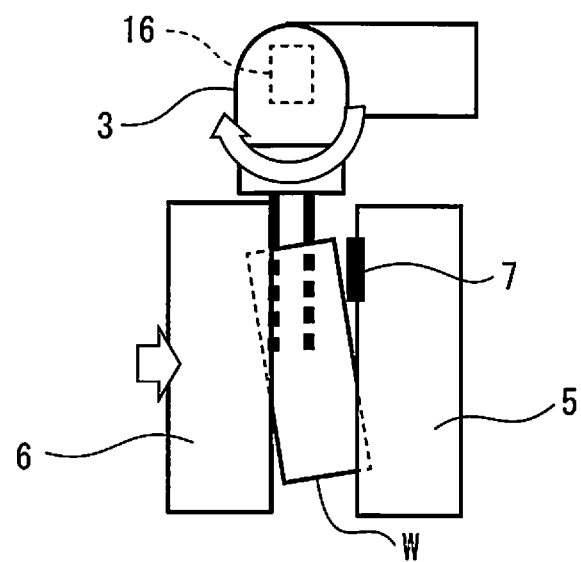
FIG. 3A is a front view schematically showing a state where the position of a work fastened by the clamp device shown in FIG. 1 is abnormal.
Figure 3B:
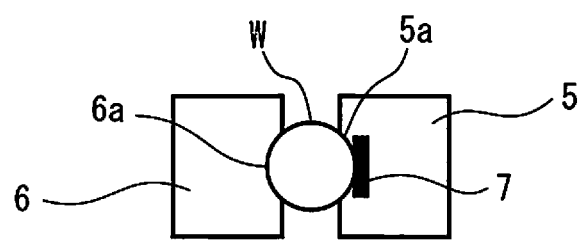
FIG. 3B is a top view of the work and clamp device shown in FIG. 3A.

FIG. 3A is a front view schematically showing a state where the position of a work W fastened by the clamp device 1 shown in FIG. 1 is abnormal. FIG. 3B is a top view of the work W and clamp device 1 shown in FIG. 3A.

In FIG. 3A and FIG. 3B, there is a machining chip 7 on the seating surface 5a of the work fastening part 5 when a work W which is gripped by the hand 3 is pushed by the work pushing part 6 against the seating surface 5a. In such a case, the work W cannot be placed to fit against the seating surface 5a. The position of the work W, as shown in FIG. 3A, greatly deviates from the normal work position shown in FIG. 2A. If processing a work W in this state, a product different from the target shape ends up being produced.

When as explained above the operation of the work pushing part 6 causes positional deviation of a work W, a disturbance torque such as shown by the void arrow in FIG. 3A acts on the servo motor 16 driving rotation of the joint supporting the hand 3. Therefore, if monitoring the disturbance torque of the servo motor 16, it is possible to detect the occurrence of an abnormality in position of a work W fastened by the clamp device 1. For this reason, the robot system 20 of the first embodiment comprises a control device 8 which has the function of monitoring the disturbance torque of the servo motor 16 driving rotation of the joint supporting the hand 3.

That is, the disturbance torque of the servo motor can be controlled by the current value of the servo motor. Further, the monitored "disturbance torque" means the difference between the torque which is input to the servo motor in response to an operating command (that is, commanded current value) and the torque which is actually used for operation of the servo motor (that is, consumed current value). For example, if the load of the servo motor is in a predetermined range, the consumed current value becomes equal to the commanded current value; therefore, no disturbance torque occurs. As opposed to this, if the load applied to the servo motor is over a predetermined range, as a result of feedback control, the consumed current value becomes larger. That is, the disturbance torque becomes larger.

Next, the control device 8 of the robot system 20 of the first embodiment will be explained.

Figure 4:
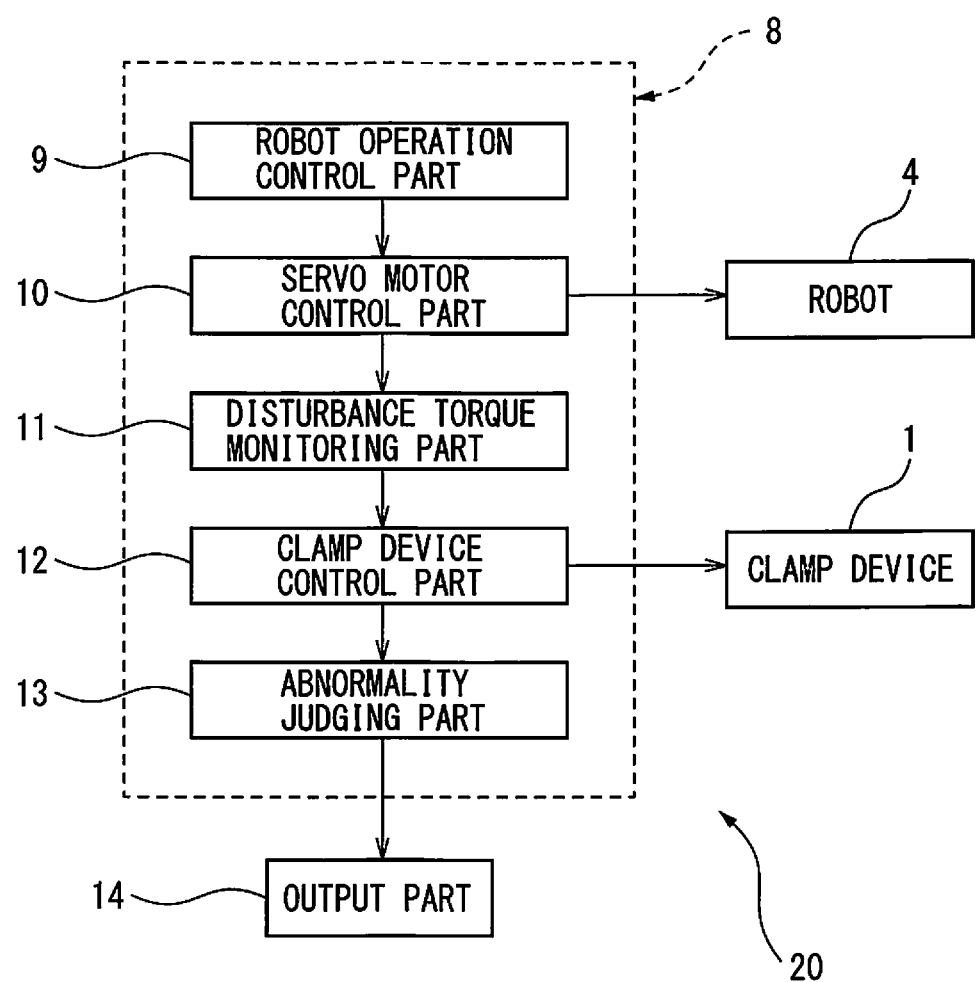
FIG. 4 is a block diagram showing the configuration of a robot control device according to a robot system of the first embodiment.

FIG. 4 is a block diagram showing the control device 8 of the robot system 20 of the first embodiment.

Referring to FIG. 4, the robot 4 is connected to a control device 8. The control device 8 is a digital computer.

The control device 8 comprises a robot operation control part 9, servo motor control part 10, disturbance torque monitoring part 11, clamp device control part 12, and abnormality judging part 13.

The robot operation control part 9 makes the robot 4 operate to make the hand 3 grip a work W and position the work W at a predetermined position of the clamp device 1.

The servo motor control part 10 controls the servo motors (not shown) driving the joints of the robot 4 in accordance with operating commands from the robot operation control part 9. Further, the operation of the robot 4 with respect to the target position is controlled using a feedback device connected to the joints of the servo motors, for example, incremental encoders.

The disturbance torque monitoring part 11 monitors the disturbance torque of a servo motor in the hand 3 which the servo motor control part 10 controls. In a case that there are three axes of rotation in the hand 3 so that the hand 3 is made to rotate in the pitch direction, yaw direction, and roll direction, the disturbance torque of the servo motor of at least one axis of rotation needs to be monitored. Further, the disturbance torque monitoring part 11 may not only monitor the disturbance torque of the servo motor driving a joint supporting the hand 3, but may also monitor the disturbance torques of the servo motors driving the other robot joints.

The clamp device control part 12 makes the clamp device 1 operate when the robot 4 places the work W at a predetermined position between the work fastening part 5 and the work pushing part 6 of the clamp device 1. That is, in the state where the work W which is gripped by the hand 3 is positioned at a predetermined position between the work fastening part 5 and work pushing part 6 of the clamp device 1, the clamp device 1 is operated and the work W is pushed against the seating surface 5a of the work fastening part 5. Further, if such an operation of the clamp device 1 ends, the disturbance torque of the servo motor monitored by the disturbance torque monitoring part 11 is sent to the abnormality judging part 13.

The abnormality judging part 13 compares the disturbance torque sent from the disturbance torque monitoring part 11 with a predetermined first threshold value (current value). Further, the abnormality judging part 13 judges that an abnormality has occurred in the work fastened position of the clamp device 1 if that disturbance torque is over the predetermined first threshold value.

Furthermore, an output part 14 which outputs an alarm when it is judged by the abnormality judging part 13 that an abnormality has occurred is connected to the control device 8. As the alarm, light, source, voice, etc. may be used alone or in any combination.

Next, the operation of the robot system 2 provided with the above described control device 8 will be explained.

Figure 5:
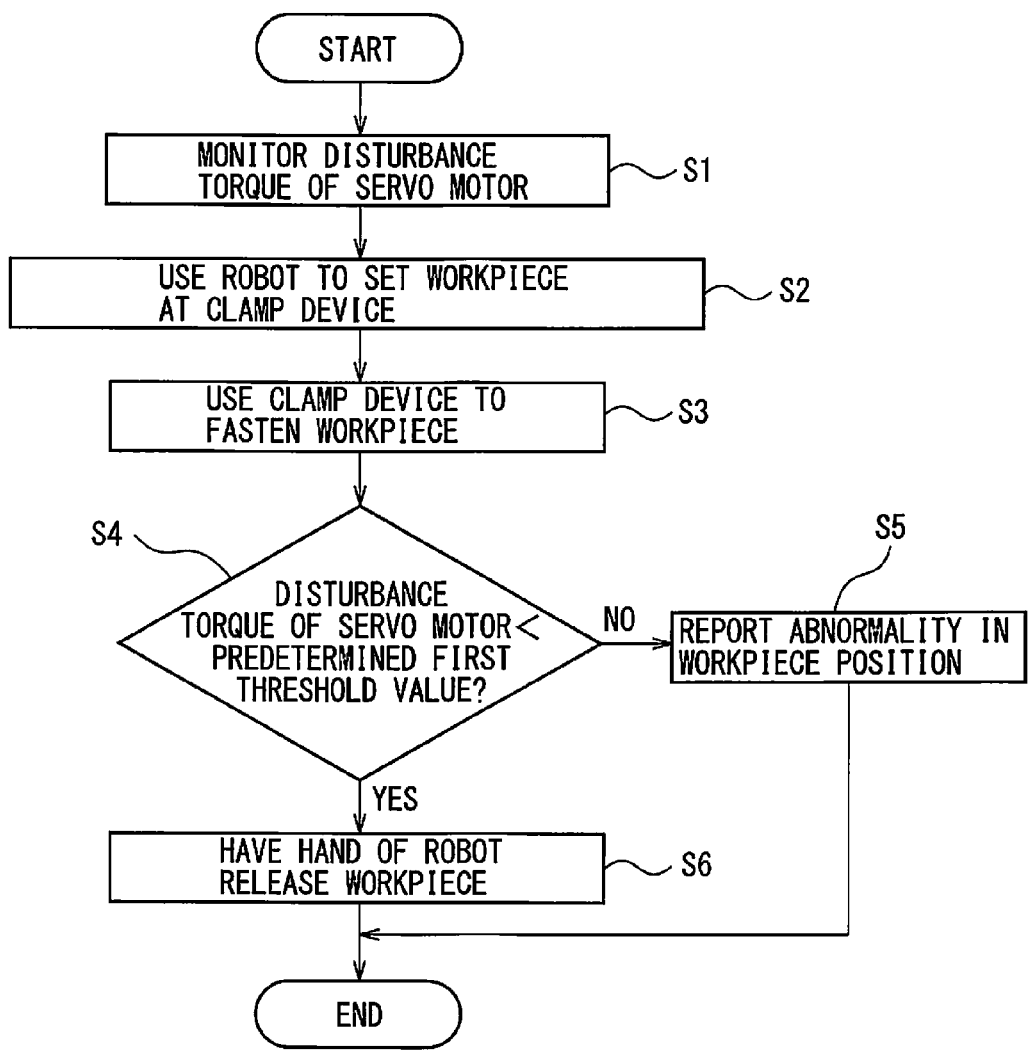
FIG. 5 is a flow chart showing an operating routine of a robot system of the first embodiment.

FIG. 5 is a flow chart showing the operating routine of the robot system 20 of the first embodiment.

If starting up the robot system 20, the control device 8 makes the robot 4 operate in accordance with preprogrammed operating commands. Due to this, the robot 4, as shown in FIG. 1, uses the hand 3 to grip a work W and make it move to the clamp device 1 which is set at the production machine 2. During movement of the work W, the disturbance torque monitoring part 11 of the control device 8 monitors the disturbance torque of a servo motor driving rotation of the joint supporting the hand 3 of the robot 4 (FIG. 5, step S1).

Subsequently, the robot 4 positions the work W gripped by the hand 3 between the work fastening part 5 and work pushing part 6 of the clamp device 1 (FIG. 5, step S2). Next, in the state where the hand 3 is used to grip the work W, the control device 8 makes the work pushing part 6 of the clamp device 1 operate (FIG. 5, step S3). Due to this, the work pushing part 6 pushes the work W against the seating surface 5a of the work fastening part 5.

If the above such operation of the clamp device 1 is finished, the abnormality judging part 13 of the control device 8 compares the disturbance torque of the servo motor monitored by the disturbance torque monitoring part 11 with the predetermined first threshold value (FIG. 5, step S4). Further, the abnormality judging part 13 judges that an abnormality has occurred in the work fastening state of the clamp device 1 if that disturbance torque is the same as the predetermined first threshold value or exceeds the predetermined first threshold value. Such an abnormality means for example when a machining chip 7 is present at the seating surface 5a of the work fastening part 5. Note that, the predetermined first threshold value can be changed in setting from the outside of the control device 8.

If the abnormality judging part 13 judges that an abnormality has occurred, the control device 8 outputs an alarm by the output part 14 to report the abnormality in the work position (FIG. 5, step S5). At this time, the control device 8 may make the production machine 2 provided with the clamp device 1 stop.

On the other hand, when the disturbance torque of the servo motor monitored by the disturbance torque monitoring part 11 is smaller than the predetermined first threshold value, the hand 3 of the robot 4 releases the work W (FIG. 5, step S6). Due to this, the work W becomes a state fastened by only the clamp device 1. After that, the production machine 2 is used to process the work W, assemble parts, etc.

As explained above, the first embodiment detects a disturbance torque of a servo motor driving a joint, of the hand 3 when a work W which is gripped by the hand 3 of the robot 4 and is positioned at a predetermined position of the clamp device 1 is fastened by the clamp device 1. Further, when the detected disturbance torque is over a predetermined first threshold value, it is judged that an abnormality has occurred in the position of the work W fastened by the clamp device 2.

For this reason, it is possible to judge if an abnormality has occurred in the position of a work W fastened by the clamp device 2 without regard as to the state of contact of the seating surface 5a of the work fastening device 5 at the clamp device land the outside surface of the work W. In other words, in the present invention, it is possible to judge abnormality of a fastened work position without being governed by the work shape. Further, by adjusting the first threshold value, it is possible to prevent a state where the position of a work fastened by the clamp device is within an allowable range being judged as an abnormality of the work position. As a result, it is possible to improve the yield of products fabricated from works W.

Furthermore, in the present invention, there is no need to add a sensor to the clamp device 2 for detecting an abnormality. As a result, it is possible to provide a robot system 20 which judges abnormality of a work by an inexpensive configuration.

Second Embodiment

Next, a second embodiment will be explained. Here, the same as component parts of the above-mentioned robot system 20 of the first embodiment will be assigned the same notations and only the points differing from the first embodiment will be explained.

Figure 6:
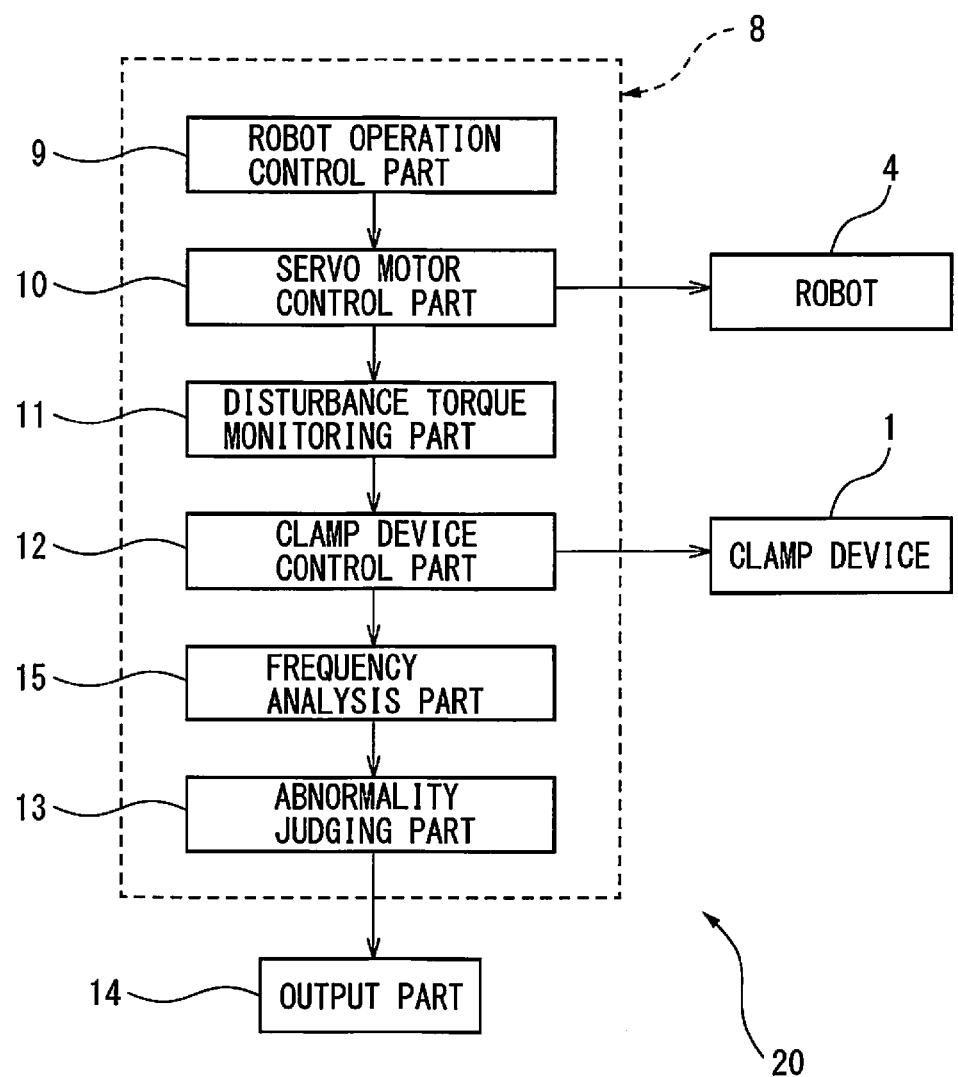
FIG. 6 is a block diagram showing the configuration of a robot control device according to a robot system of a second embodiment.

FIG. 6 is a block diagram showing a control device 8 of the robot system 20 of the second embodiment.

In the second embodiment, as shown in FIG. 6, the control device 8 shown in FIG. 4 further has a frequency analysis part 15 added to it.

The frequency analysis part 15 performs frequency analysis on the history of disturbance torque of a servo motor monitored by the disturbance torque monitoring part 11, for example FFT (Fast Fourier Transform) analysis. Further, the frequency analysis part 15 uses FFT analysis to break down the history of disturbance torque of the servo motor into a plurality of frequency components then extracts a specific frequency component from among the plurality of frequency components and sends it to the abnormality judging part 13. Note that, the extracted specific frequency component is the frequency which is generated when a work W is damaged when using the clamp device 1 to fasten the work W.

The abnormality judging part 13 compares the specific frequency component sent from the frequency analysis part 15 with a predetermined second threshold value. Further, the abnormality judging part 13 judges that damage has occurred at the work W fastened by the clamp device 1 when that specific frequency component is over the predetermined second threshold value (frequency).

Next, the operation of the robot system 20 provided with the control device 8 of the second embodiment will be explained.

Figure 7:
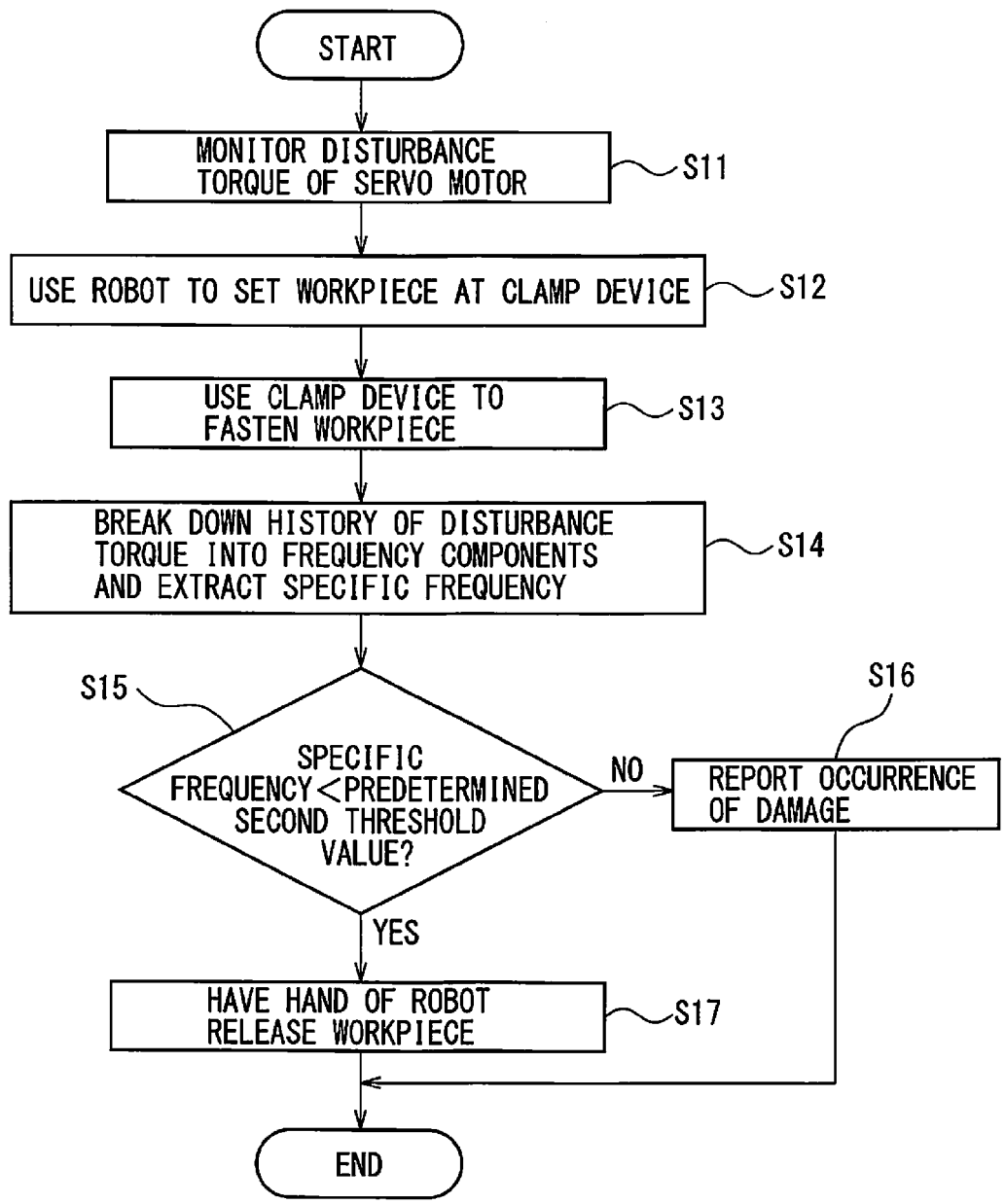
FIG. 7 is a flow chart showing an operating routine of a robot system of the second embodiment.

FIG. 7 is a flow chart showing the operating routine of the robot system 20 of the second embodiment.

If starting up the robot system 20, the control device 8 makes the robot 4 operate in accordance with preprogrammed operating commands. Due to this, the robot 4, as shown in FIG. 1, uses the hand 3 to grip a work W and move it to the clamp device 1 set at the production machine 2. While the work W is moving, the disturbance torque monitoring part 11 of the control device 8 monitors the disturbance torque of a servo motor driving rotation of the joint supporting the hand 3 of the robot 4 (FIG. 7, step S11).

Next, the robot 4 positions the work W gripped by the hand 3 between the work fastening part 5 and work pushing part 6 at the clamp device 1 (FIG. 7, step S12). Then, in the state where the hand 3 grips the work W, the control device 8 operates the work pushing part 6 of the clamp device 1 (FIG. 7, step S13). Due, to this, work pushing part 6 pushes the work W against the seating surface 5a of the work fastening part 5.

When such an operation of the clamp device 1 ends, the frequency analysis part 15 uses FFT analysis to break down the history of disturbance torque of the servo motor into a plurality of frequency components and extract from there a specific frequency component among the plurality of frequency components (FIG. 7, step S14).

Next, the abnormality judging part 13 of the control device 8 compares the specific frequency component extracted by the frequency analysis part 15 with a predetermined second threshold value (FIG. 7, step S15). Further, the abnormality judging part 13 judges that damage has occurred at the work W fastened by the clamp device 1 when that specific frequency is the same as the predetermined second threshold value or over the predetermined second threshold value. Note that, the predetermined second threshold value can be changed in setting from outside of the control device 8.

When the abnormality judging part 13 judges that damage has occurred, the control device 8 outputs an alarm by the output part 14 and reports the occurrence of damage (FIG. 7, step S16). At this time, the control device 8 may make the production machine 2 provided with the clamp device 1 stop.

On the other hand, if the specific frequency component sent from the frequency analysis part 15 is smaller than the predetermined second threshold value, the hand 3 of the robot 4 releases the work W (FIG. 7, step S17). Due to this, the work W becomes a state fastened by only the clamp device 1. After that, the production machine 2 processes the work W, assembles parts, etc.

According to the above explained second embodiment, when fastening the work W gripped by the hand 3 of the robot 4 by the clamp device 1, it is possible to judge if the shock at the time of fastening has caused the work W to be damaged. Due to this, it is possible to improve the yield of products fabricated from works W.

Note that, in the second embodiment, the abnormality judgment method of the first embodiment may be additionally performed. That is, it is also possible to make an operation like the first embodiment of comparing the disturbance torque of a servo motor monitored by the disturbance torque monitoring part 11 with a predetermined first threshold value and judging if an abnormality has occurred in the work fastening state of the clamp device 1 be additionally performed by the abnormality judging part 13.

Advantageous Effects of Invention

According to the first aspect of the present invention, when a work which is gripped by a hand of a robot and is positioned at a predetermined position of a work fastening device is fastened by the work fastening device, the disturbance torque of a motor driving a joint of the robot is detected. Further, if the detected disturbance torque is over a predetermined first threshold value, it is judged that an abnormality has occurred at the position of the work fastened by the work fastening device.

For this reason, it is possible to judge if an abnormality has occurred in the position of a work fastened by the work fastening device without regard as to the state of contact of the work seating surface at the work fastening device and the outside surface of the work. In other words, it is possible to judge abnormality of a fastened work position without being governed by the work shape. Further, by adjusting the first threshold value, it is possible to prevent a state where the position of a work fastened by the work fastening device is within an allowable range being judged as an abnormality of the work position. As a result, it is possible to improve the yield of products fabricated from works.

Furthermore, there is no need to add a sensor for detecting abnormality to the work fastening device. As a result, it is possible to provide a robot system which judges abnormality of a work by an inexpensive configuration.

According to the second aspect of the present invention, when fastening a work gripped by the hand of the robot by the work fastening device, it is possible to judge if the shock at the time of fastening has caused the work to be damaged. Due to this, it is possible to improve the yield of products fabricated from works.

According to the third aspect of the present invention, a work fastening part which has a seating surface which the outside surface of a work contacts and a work pushing part which has a pushing surface which pushes the work against the seating surface are provided; therefore, at the time of fastening a work, the work is placed so as to fit against the work seating surface fastening part. Due to this, the work fastening device can precisely fasten the work.

The fourth aspect and fifth aspect of the present invention respectively exhibit similar effects as the first aspect and second aspect of the present invention.

Above, representative embodiments were shown, but the present invention is not limited to the above embodiments. The above embodiments can be changed to various shapes, structures, materials, etc. within a range not departing from the concept of the present invention.

What is claimed is:

1. A robot system comprising
a work fastening device which positions and fastens a work,
a robot to which a hand which grips a workpiece is attached, and
a control device which controls the work fastening device and the robot, wherein
the control device has
a robot operation control part which causes the robot to operate to grip a work by the hand and to place the gripped work at a predetermined position of the work fastening device,
a disturbance torque monitoring part which monitors a disturbance torque of a motor which drives rotation about a joint of the robot in accordance with an operating command of the robot operation control part,
an abnormality judging part which, when gripping a work by the hand of the robot, compares the disturbance torque with a predetermined first threshold value and, when the disturbance torque is over the first threshold value, judges that an abnormality has occurred in the position of the work fastened by the work fastening device, and
a frequency analysis part which breaks down a history of disturbance torque of the motor which is monitored by the disturbance torque monitoring part into a plurality of frequency components and extracts a specific frequency component from among the plurality of frequency components, wherein
the abnormality judging part is configured to compare the specific frequency component with a predetermined second threshold value when the work gripped by the hand is fastened by the work fastening device and, when the specific frequency component is over the second threshold value, to judge that damage has occurred at the work fastened by the work fastening device.

2. The robot system according to claim 1 wherein the work fastening device further comprises a work fastening part which has a seating surface which the outside surface of the work contacts and a work pushing part which has a pushing part which pushes the work against the seating surface.

3. An abnormality judgment method which judges abnormality of a work which is loaded by a robot into a work fastening device and is fastened by that work fastening device, the abnormality judgment method comprising,
monitoring a disturbance torque of a motor driving rotation about a joint of the robot in response to an operating command to the robot and, when gripping a work by a hand of the robot, arranging it at a predetermined position of the work fastening device, and then fastening the gripped work by the work fastening device, comparing the disturbance torque with a predetermined first threshold value and, when the disturbance torque is over a first threshold value, judging that an abnormality has occurred in the position of the work fastened by the work fastening device, and breaking down a history of disturbance torque of the motor which is monitored into a plurality of frequency components, extracting a specific frequency component from among the plurality of frequency components, comparing that specific frequency component with a predetermined second threshold value and, when the specific frequency component is over the second threshold value, judging that damage has occurred in the work fastened by the work fastening device.

* * * * *